Nov. 6, 1962
J. P. LE BEL
3,062,148
SPACE VEHICLE
Filed Jan. 25, 1960
3 Sheets-Sheet 1
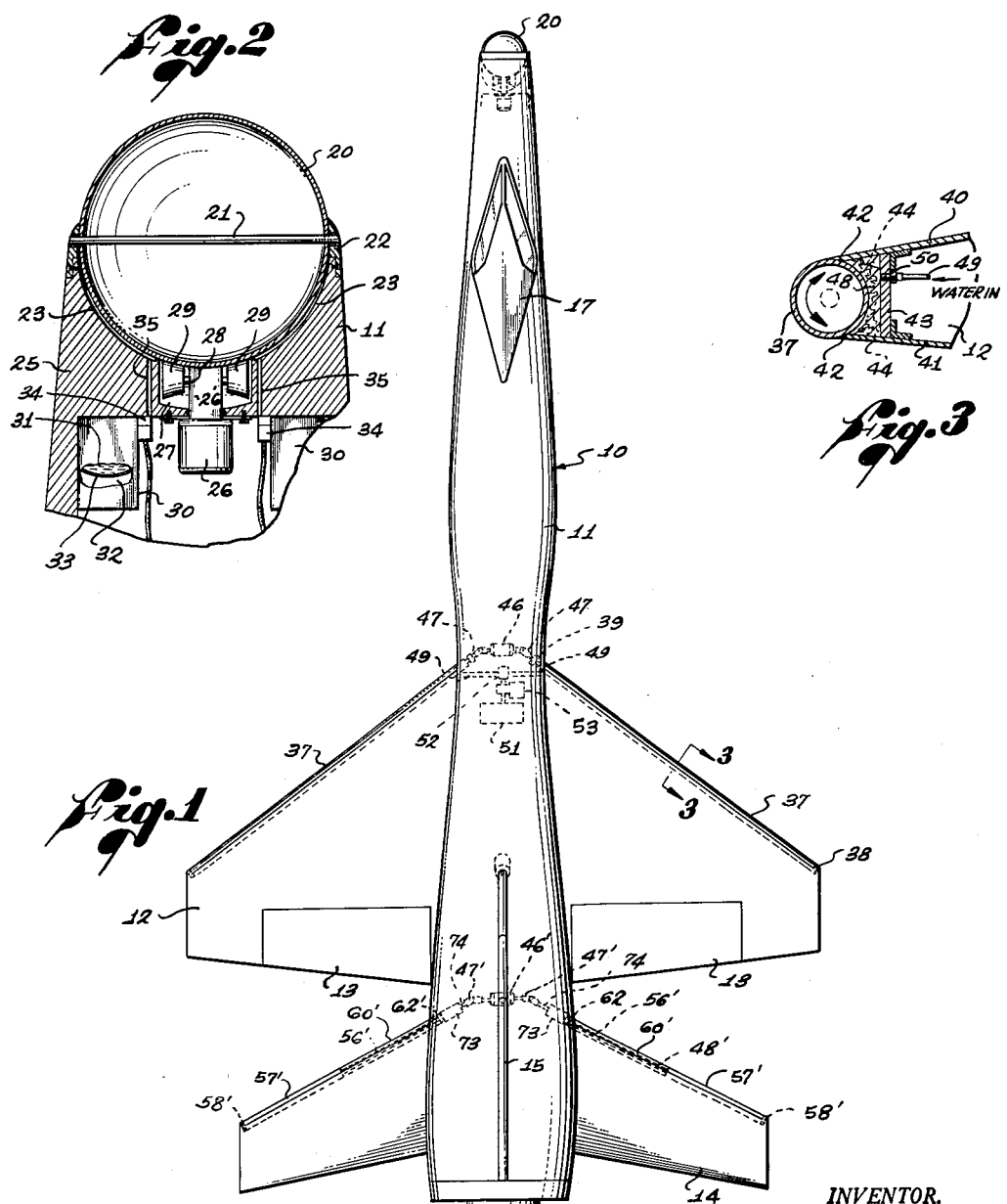
INVENTOR.
JOHN P. LE BEL
BY Fulwider Mattingly & Huntley
Attorneys

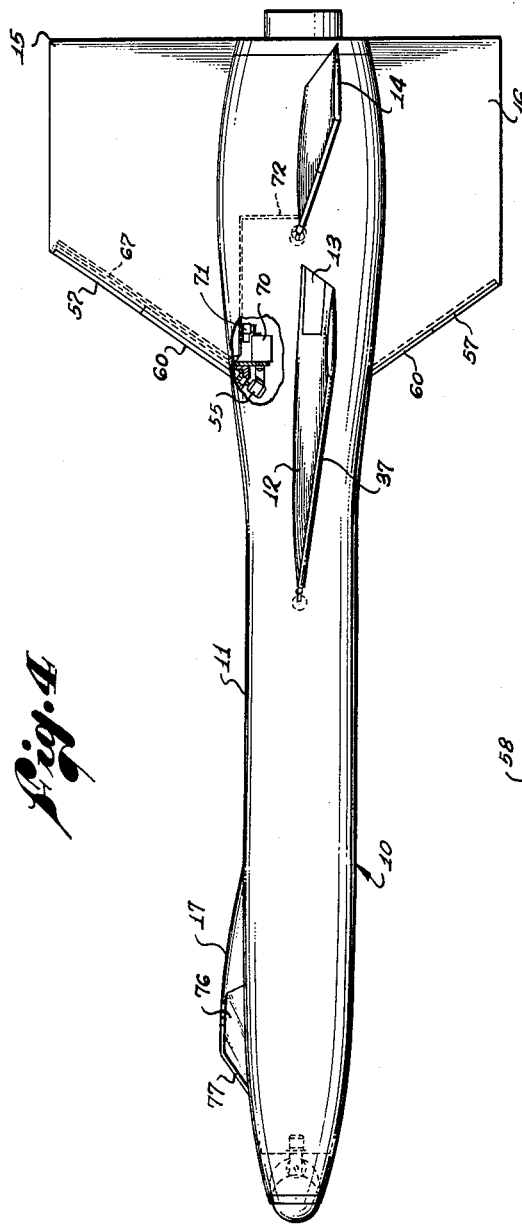

Nov. 6, 1962  J. P. LE BEL  3,062,148
SPACE VEHICLE
Filed Jan. 25, 1960  3 Sheets-Sheet 3
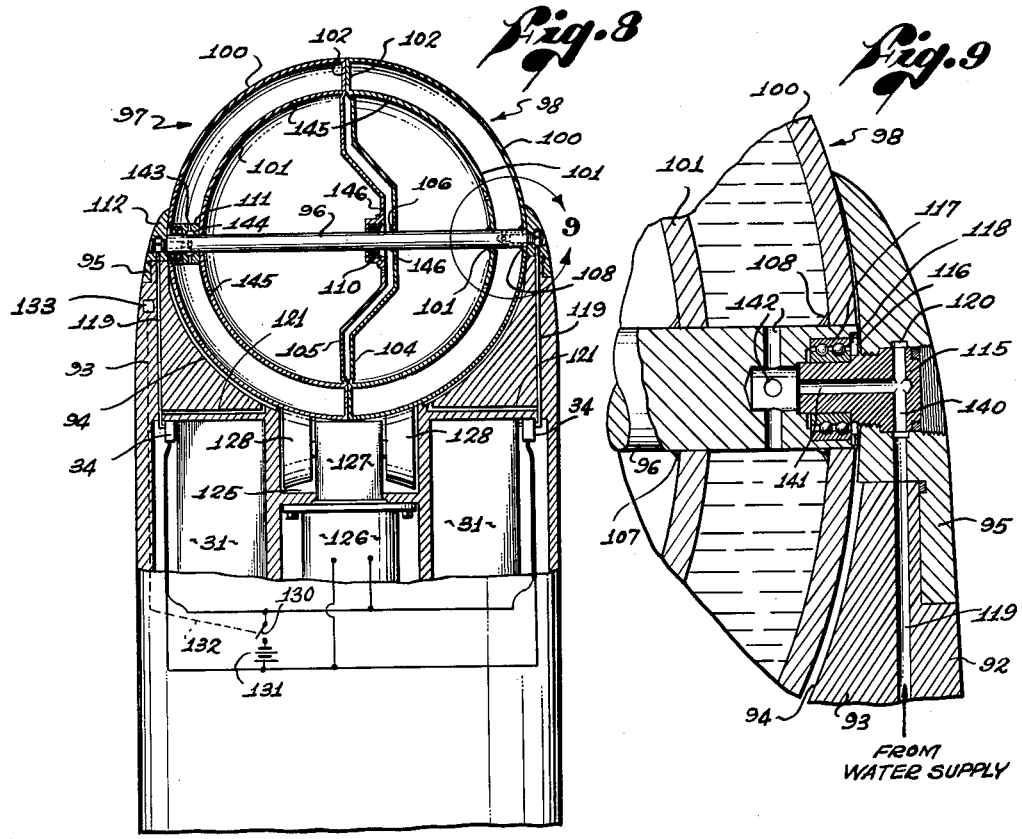
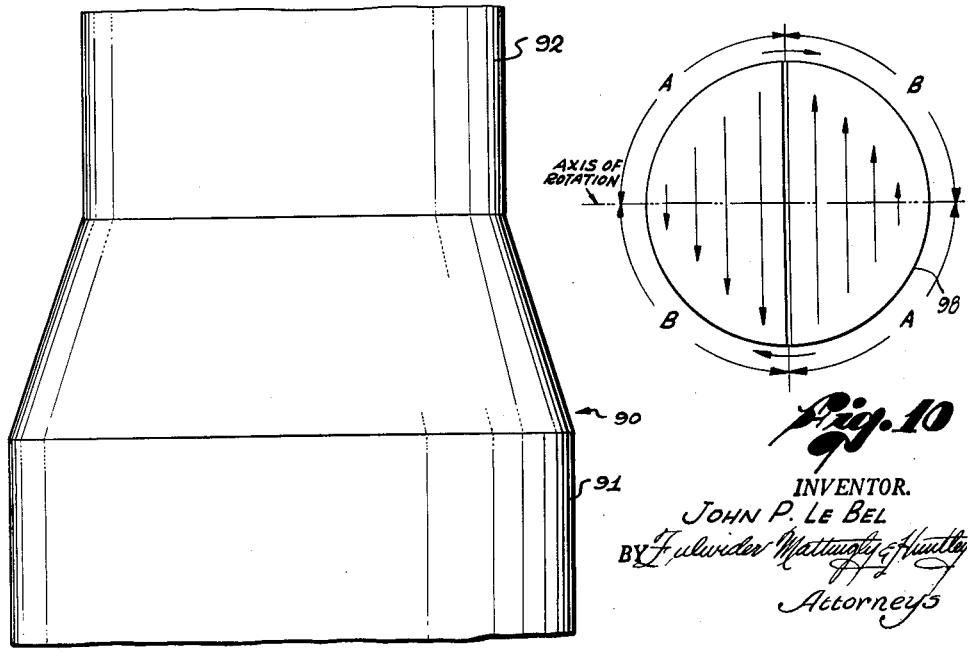
INVENTOR.
JOHN P. LE BEL
BY Fulwider Mattingly & Huntley
Attorneys

United States Patent Office 3,062,148
Patented Nov. 6, 1962

3,062,148
SPACE VEHICLE
John P. Le Bel, Los Angeles, Calif., assignor of one-half to Hugh E. Nichols, Higley, Ariz.
Filed Jan. 25, 1960, Ser. No. 4,388
12 Claims. (Cl. 102—92.5)

The present invention relates generally to space vehicles, and particularly a means to prevent the generation of excessive heat in the airframe of space vehicles during supersonic flight through the atmosphere.

The term "space vehicle" connotes unmanned missiles and manned craft designed for flight outside of and through the earth's atmosphere. Upon entering the atmosphere such vehicles generate extreme temperatures, assumed to be in proportion to the square of the supersonic velocity, due to the resistance offered by the ram effect of the air. This is frequently referred to as the "heat barrier" since these temperatures may exceed 15,000° Fahrenheit and thus consume the vehicle before it can be brought to earth. So far as is known, no such vehicle has yet penetrated this barrier successfully, i.e., without having its payload excessively damaged by heat.

An important object of my invention is to provide a means to enable space vehicles to successfully penetrate the heat barrier.

Another object of the invention is to provide leading surfaces of space vehicles, such as nose-cone sections, windshields, and leading edges of airfoils or fins and the like, with a coolant means to inhibit the radical increase of temperature in these parts of the airframe, which are initially subjected to the barrier, and from which surfaces the heat is conducted or transferred to trailing surfaces.

A further object of the invention is to provide a lightweight coolant system for space vehicles utilizing a simplified apparatus and a small volume of coolant whereby a corresponding increase in payload may be achieved.

It is also an object of the invention to provide a coolant means for a nose-cone section of a missile that will also impart a degree of stability about the longitudinal axis of the nose-cone section to increase the accuracy with which the payload can be guided to a target.

It is also an object of the invention to provide a coolant means for the leading surfaces of a manned space vehicle that will not adversely affect the aerodynamic characteristics of the manned vehicle and, further, will also provide an additional and selectively controllable means for aerodynamically controlling the manned vehicle. This arrangement also has the advantage of enabling a manner space vehicle to utilize the ram effect of the atmosphere as a braking agent to decelerate the aircraft at a controlled rate. Thus, a manned vehicle can be brought to earth at a desired landing point, directly, rather than relying upon gradual deceleration through a process of orbital decay, as, for example, skip-hopping into and out of successively denser strata of the atmosphere.

These and other objects and advantages of my invention will be apparent from the following description when taken in conjunction with the annexed drawings wherein:

FIGURE 1 is a plan view of a manned space vehicle incorporating my invention in the leading surfaces thereof;

FIGURE 2 is a fragmentary sectional view of the nose section of the vehicle shown in FIGURE 1, the section being taken through the longitudinal axis of the vehicle and illustrating one form of a coolant means;

FIGURE 3 is a fragmentary sectional view taken on the line 3—3 of FIGURE 1 and showing another form of coolant means particularly adapted for incorporation in the leading edges of airfoils, fins, and other similar surfaces;

FIGURE 4 is a side elevational view of the vehicle shown in FIGURE 1;

FIGURE 5 is a fragmentary sectional view of the leading-edge portion of the upper vertical control surface of the manned vehicle, showing details of the coolant system;

FIGURE 6 is a partial elevational view of the cockpit area of the vehicle shown in FIGURE 4, portions thereof being cut away to show details of construction of a windscreen coolant system;

FIGURE 7 is a sectional view on the line 7—7 of FIGURE 6;

FIGURE 8 is a partial elevational view of a missile incorporating another embodiment of coolant means in the leading surface of the nose section, a portion being shown in diametral cross section to show interior details of construction;

FIGURE 9 is a view on an enlarged scale of the area 9 in FIGURE 8; and

FIGURE 10 is a schematic front end view of the nose section.

FIGURES 1 through 7 show cooling means according to my invention adapted for use in a manned space vehicle 10. This vehicle is adapted for flight both above and below altitudes of 60 miles and, accordingly, is provided with conventional airfoils and control surfaces for controlling the craft in subsonic, transonic, and supersonic atmospheric flight. Thus, the vehicle 10 has a horizontal wing 12 fitted in its trailing edge with a pair of elevons 13, a horizontal stabilizer 14, an upper vertical stabilizer 15, and a lower vertical stabilizer 16. According to my invention the leading edges of all of these airfoils are provided with a coolant means. In addition, the forward surface or nose of the fuselage 11 is also provided with a coolant means, as is also the windscreen of a cockpit enclosure 17. The vehicle 10 may have a rocket motor and thus comprise the last stage of a multi-stage vehicle. Alternatively, the manned vehicle 10 may be adapted for gliding or free-fall return into the atmosphere and may have an air-breathing engine for use beneath altitudes of about 20 miles.

When the vehicle 10 enters the atmosphere at high supersonic speeds the ram effect causes generation of heat on the nose of the fuselage 11. The vehicle 10 is concurrently decelerated and eventually will slow down to a speed at which the ram effect will not cause the generation of any temperature which will exceed the failure temperature of the material. However, in a manned vehicle the deceleration must be retarded at a rate which can be withstood by the occupant of the vehicle; the pilot must thus control the glide angle by maneuvering the vehicle 10 with suitable reaction jet controls and by the conventional airfoil controls. At the same time the leading surfaces, such as the nose of the fuselage 11 and leading edges of the airfoils, must be maintained at a temperature which is safe for the materials used. The cooling means need not be constantly in operation, but, on the other hand, must have a capacity sufficient to dissipate dangerous heat during the period of deceleration.

For cooling the nose of the fuselage 11 I utilize an evaporative cooling system which has a hollow, evacuated sphere 20 having a diametrally extending axle 21 which protrudes beyond the sphere. The ends of this axle are journaled in a ring 22 that is adapted to receive a diametral sector of the sphere and is secured to and faired into the forward end of the fuselage 11.

The fuselage 11 has a bulkhead 25 with a concave or substantially hemispherical cavity 23 adapted to receive the sphere 20. This cavity and the ring 22 are together adapted to define a recess of slightly greater than hemispherical configuration. The sphere 20 may have a running fit in the fuselage cavity 23 or, alternatively, may be slightly smaller than the cavity.

The bulkhead 25, on whose forward face the cavity 23 is defined, mounts a motor 26 on its aft face. This motor has a forwardly extending output shaft (not shown) extending through the bulkhead and mounted in a gearbox 26 disposed within a pocket 27. This gearbox has a transversely extending output shaft 28 extending out from its opposite sides and drivingly mounting at opposite ends a pair of rollers 29 in driving engagement with the sphere 20.

The fuselage 11 also mounts on the aft face of the bulkhead 25 a pair of pressure pots 30, each comprising a water chamber 31 and a compressed air chamber 32 that are divided by a diaphragm 33. The water chambers of the pressure pots 30 have outlets which are normally closed by solenoid-operated valves 34, these valves in turn having outlets communicating with passages 35 extending longitudinally through the bulkhead 25 to communicate with the cavity 23.

The axle 21 is disposed normal to the longitudinal axis of the vehicle 10. The motor 26 is of the reversible type and is controllable by the pilot both as to speed and direction of rotation. It is also to be understood that the valves 34 are selectively controllable by the pilot so as to be opened and closed at will.

The cockpit 17 includes instrumentation observable by the pilot for detecting the increase of temperature in the forward portion of the fuselage 11. Upon descent, the pilot observes this temperature and when it reaches a predetermined value the pilot actuates the motor 26 to rotate the sphere 20, and simultaneously opens the valves 34. As a result, the pressure of the air in the chambers 32 of the pressure pots 30 drives water through the valves and through the passages 35, whereby the water is fed into the cavity 23 and pocket 27. Accordingly, the sphere 20 rotates through the water in the pocket 27 and cavity 23, whereby a portion of the heat of the sphere is dissipated in evaporating the water.

For cooling the leading edges of the wing 12 I also utilize an evaporative cooling system. Referring to FIGURE 1, it will be seen that both leading edges of the wing 12 consist of an elongated hollow tube 37, each tube extending from a bearing support 38 at the wing tip to another bearing support 39 disposed within the fuselage 11. The wing 12 has upper and lower skins 40 and 41, respectively, whose leading edges are concave as shown in FIGURE 3 to provide additional seats for the tube 37. A forward spar 43 on each side of the wing 12 is spaced rearwardly of the tube 37 and a plurality of spaced-apart fillets 44 are fixed in the corners or within the angles defined by the inner surfaces of the skins 40 and 41 and the forward face of the spar 43 for reinforcing the leading edges of the skins.

It will be noted from FIGURE 3 that the tube 37 has an outer diameter tangent with the outer surfaces of the skins 40 and 41. The tube is thus faired into the airfoil configuration, so as to avoid the creation of induced drag. It will also be understood that the representation of FIGURE 3 is primarily for purposes of illustration and, accordingly, for a wing 12 of the thickness indicated a smaller diameter of tube 37 may be employed in conjunction with increased cambers of the upper and lower skins 40 and 41, whereby the over-all airfoil configuration will more closely conform to a wedge. In addition, although the tube 37 is represented as having substantially one-half its circumference exposed, it should be understood that less than one-half its circumference can be exposed.

The inner end of each tube 37 within the fuselage 11 is drivably connected to a reversible motor 46 through a pair of universal joints 47. This motor can be controlled by the pilot of the vehicle 10 both as to speed of rotation and direction of rotation, whereby the tubes 37 may be driven in clockwise or counterclockwise directions as shown by the arrow in FIGURE 3. Within the wing 12 the space between each tube 37 and its adjacent spar 43 is filled with a porous material 48, that is saturable by the coolant medium. The material 48 is preferably rigid and incompressible to provide a firm seat for the tube 37, although a yieldable material and auxiliary rigid bearings for the tube can be employed. A conduit 49 for coolant extends behind each of the front spars 43 for the length of the leading edge of the wing, and each conduit 49 has a plurality of spaced-apart orifices 50 passing through the spar in order to pass a coolant such as water into the porous medium 48. At their ends within the fuselage 11 the pair of conduits 49 have communication with a water reservoir 51 through a valve 52 and pump 53. This pump and valve are also conventionally controllable by the pilot of the vehicle 10.

The vehicle 10 is provided with a means for indicating to the pilot the temperature adjacent the leading edges of the wing 12. When this temperature becomes dangerous to the material of the wing structure the pilot actuates the motor 46 and pump 53 and opens the valve 52. Coolant is then delivered from the reservoir 51 outwardly through the conduits 49 for delivery into the porous medium 48 through the orifices 50. The cooling water is thus caused to saturate the medium 48 and the tubes 37. The rotating tubes 37 then pass in heat-exchanging relationship to the saturated medium 48 and evaporative cooling takes place. By controlling the rate of rotation of the tubes 37 and the rate of delivery of the coolant medium the pilot is enabled to adjust the capacity of the evaporative cooling system to the rate at which heat is generated on the leading edges of the wing by the ram effect.

Apart from their function in the evaporative cooling system, the tubes 37 also serve as a selectively controllable aid in aerodynamically guiding the flight of the vehicle 10, especially in controlling the rate of descent into or through the atmosphere. By controlling the rate of descent the pilot can control the rate of deceleration to maintain the $g$ forces within limits such as can be withstood by the pilot and the vehicle 10. The pilot is also enabled to thus limit the force of the ram effect during deceleration of the vehicle 10 whereby to maintain the ram temperature within the limits of the capacity of the evaporative cooling system.

Thus, suppose that the tubes 37 are rotated in clockwise direction as viewed in FIGURE 3. This will result in an increase in the coefficient of lift of the wing 12 since the rate of flow of air across the under surface of the wing is decreased while the rate of flow of air over the upper surface of the wing is increased. Therefore, if the vehicle 10 is decelerating or descending at too great a rate, the pilot actuates the tubes 37 for rotation in clockwise direction. Conversely, if the pilot wishes to increase the rate of deceleration and descent of the vehicle 10, the tubes 37 are caused to rotate in counterclockwise direction as viewed in FIGURE 3, whereby the coefficient of lift of the wing 12 is decreased.

The pilot can also use the direction of rotation of the sphere 20 as a canard type of control over the rate of descent. Since the sphere 20 is situated far forward of the center of gravity of the vehicle 10, its rotation has an appreciable effect on the rate of descent even though the fuselage is not a lift-producing element.

The leading edge of each half of the wing 12 may be provided with a plurality of rotatable tubes rather than the single tubes 37, the tubes on each half of the leading edge of the wing being mounted for counterrotation. With such an arrangement the effect of rotation of the several tubes on each wing half on the coefficient of lift of the wing 12 can be neutralized, whereby the conventional aerodynamic control of the vehicle 10 may be solely utilized for controlling the rate of descent and deceleration. While not shown in conjunction with the wing 12, such an arrangement is shown in conjunction with the vertical stabilizers 15 and 16 and horizontal stabilizer 14. In addition, the evaporative cooling system employed for the horizontal stabilizer 14 further demonstrates an arrangement wherein, although each leading edge of the stabilizer is fitted with a plurality of tubes. these tubes may nevertheless be controlled selectively for counterrotation or co-rotation.

The cooling means for the leading edges of the vertical stabilizers 15 and 16 are substantially identical, and therefore but one will be described. As is shown in FIGURE 5, a motor 55 is mounted in the fuselage 11 having an elongated output shaft 56 disposed at an angle equal to the sweepback angle of the leading edge of the vertical stabilizer 15. A tube 57, comprising a coaxial extension of the shaft 56, is drivably affixed to the outer end of the shaft and the tube, in turn, has its uppermost end journaled in a bearing means 58 at the top of the stabilizer 15. The tube 57 thus rotates in the direction of rotation of its drive shaft 56.

Another tube 60 is mounted coaxially around the shaft 56 and at its outer end is rotatably supported on the shaft 56 by a bearing means 61. At its inner end within the fuselage 11 the tube 60 is affixed to another bearing means 62 mounted on the shaft 56. A gearbox 63 is mounted on the motor 55 and drives a tubular member 64, through which the output shaft 56 passes, in the opposite direction from the output shaft. This member 64 is drivingly connected to the outer race of the bearing means 62 and, accordingly, drives the tube 60 in a direction opposite to the direction of rotation of the outermost tube 57.

It will be appreciated that the relative lengths of the tubes 60 and 57 will largely be dependent upon the configuration and aerodynamic characteristics of the vertical stabilizer in which they are mounted. The lengths of these tubes are such that the effects of rotation of the tubes will counteract or neutralize one another, so as not to impair the desired characteristics of the stabilizer. Thus, since the vertical stabilizer 15 has a lesser chord length at its tip than at its root, the outermost tube 57 may be made longer than the innermost tube 60, or may have a different rotational speed.

The tubes 57 and 60 may be backed up by a section of the porous material 48 such as is shown in FIGURE 3, but may also be cooled by the arrangement shown in FIGURE 5. In that figure it will be seen that the vertical stabilizer 15 has a vertical spar 66 which is parallel to and spaced aft of the tubes 57 and 60. A spray pipe 67 is affixed onto the spar 66, extending the length of the spar and downwardly into the fuselage 11. This pipe is provided with a plurality of longitudinally spaced-apart spray orifices 68 through which water or another suitable coolant medium can be sprayed onto the tubes 60 and 57. Spaced-apart inserts 69 are also mounted on the spar 66 to provide bearing support for the tubes 57 and 60.

Within the fuselage 11 there is a coolant reservoir 70 from which the coolant is drawn by a pump 71 for delivery into the spray pipe 67. While not shown, it will be understood that a similar coolant distribution system is incorporated in the lower vertical stabilizer 16 for cooling the counterrotating tubes 60 and 57 of the lower stabilizer.

The coolant means for the leading edges of the horizontal stabilizer 14 is similar in some respects to both the means for the leading edges of the wing 12 and the coolant means for the leading edges of the vertical stabilizers 15 and 16. Thus, the leading edge of both halves of the horizontal stabilizer 14 is provided with a shaft 56' and a plurality of tubes 57' and 60', mounted in suitable bearing means such as the means 58, 61, and 62 shown in FIGURE 5. However, for rotating the tubes 57' and 60' I employ a means similar to that for rotating the tubes on the leading edges of the wing 12 comprising a reversible, variable-speed motor 46' having an output shaft extending from opposite sides thereof, each end of the shaft being connected to a universal joint 47' having an output shaft 74. Although not shown in FIGURE 1, it is to be understood that the tubes 57' and 60' are backed up by porous medium 48' and that a coolant distribution system like the conduit 49 and orifices 50 shown in FIGURE 3 are employed to introduce coolant into the porous medium. The coolant water may be supplied from the reservoir 70 through a branch line 72 having a T-connection downstream of the pump 71 with the spray pipeline 67 (see FIGURE 4).

Referring now to FIGURE 1, it will be noted that each shaft 56' terminates at a gearbox 73 mounted in the fuselage 11 and whose input comprises a shaft 74. This gearbox includes a means, which may be a planetary gear train, for causing the tube 60' to move in the same direction or oppositely to the tube 57'. Thus, the tubes 57' and 60' may be driven for co-movement in the same direction in either a clockwise or counterclockwise direction, or, alternatively, they may be caused to undergo counterrotation.

For normal supersonic flight the tubes 57' and 60' can be set into counterrotation, along with the tubes 60 and 57 of the vertical stabilizers 15 and 16. The aerodynamic characteristics of the tail surfaces would therefore be substantially unimpaired. However, if the attitude of the vehicle 10 should be changed in a manner to adversely affect the downward angle on the horizontal stabilizer 14, the gearbox 73 can be actuated by the pilot to cause the tubes 60' and 57' to undergo concurrent rotation in a counterclockwise direction, i.e., corresponding to counterclockwise as represented in FIGURE 3. In some attitudes it may be desirable to cause the tubes 60' and 57' to be urged into concurrent clockwise rotation.

The windscreens of the cockpit enclosure 17 and the centerpost 77 thereof are also subjected to ram-effect heating. Accordingly, I have devised a cooling system for the windscreens 76 and centerpost 77, best seen in FIGURES 6 and 7.

The cockpit enclosure 17 is conventionally air conditioned and pressurized and a coolant reservoir 78 is mounted in the air-conditioned pressurized enclosure. The reservoir may be finned or otherwise adapted for heat-exchanging relationship with the cockpit atmosphere and has an outlet pipe 79 leading to a pump 80. From the pump 80 another pipe 81 extends upwardly to the same level as the upper edge of the windscreen 76, it being understood that there is a distribution pipe 81 leading to the upper edge of each windscreen.

Each windscreen comprises two similar plates 82 of a suitable glass that are parallel to one another and maintained in spaced-apart relationship by distribution pipes mounted along the upper and lower edges of the two plates of glass and also along the forward edges of the glass where the windscreen is set into the centerpost 77. FIGURE 7 is typical, showing a distribution pipe 83 having a plurality of openings communicating with the space between the two plates 82, the pipe itself being set into a suitable sealing strip 84 that, in turn, is received within an edge of the cockpit enclosure, or the centerpost 77, as the case may be. A pair of return pipes 85, one of which is shown in FIGURE 6, communicate the pipes 82 of the lower edges of the windscreen 76 with the reservoir 78.

This cooling system is full of water or other suitable transparent coolant liquid at all times, but the pump 80 need be actuated only when extremes of temperature are encountered. The coolant medium then circulates through the system in heat-exchanging relationship to the plates 82 and also in heat-exchanging relationship, while in the reservoir 78, with the air-conditioned atmosphere of the enclosure 17. At the same time some of the heat of the centerpost 77 is dissipated due to the presence of the circulation pipe 81 within the centerpost.

In FIGURES 8 and 9 I have shown a coolant system particularly devised for inclusion in the nose sections of unmanned missiles.

FIGURE 8 shows an elevation of a part of a plural-stage missile designated generally by the numeral 90, having a lower stage 91 and a nose section 92. At its forward end the nose section has a bulkhead 93 in whose forward face a substantially hemispherical cavity 94 is formed. The extreme upper edge of the nose section 92 is surmounted by a band 95 whose exterior surface is faired into the exterior of the nose section, and this band mounts an axle 96 which, in turn, mounts a pair of hemispherical assemblies 97 and 98. The sphere defined by the pair of assemblies 97 and 98 is adapted for rotation through the hemispherical cavity 94.

Each of the assemblies 97 and 98 includes a pair of hemispheres 100 and 101 of different diameters and maintained in concentric relationship on the axle 96 whereby to define an enclosed space between the two hemispheres. This space is closed along the diametral plane of each assembly by an annular band or ring 102, and the rings 102 of the two assemblies 97 and 98 are in sliding contact.

The interior of the hemisphere 101 of the assembly 98 is closed by a disc 104, while the interior of the hemisphere 101 of the other assembly is closed by a disc 105. To baffle the entry of air between the assemblies 97 and 98, the disc 104 is dished inwardly of the right-hand assembly 98, while the disc 105 is dished outwardly of the left-hand assembly 97. The two discs are of complementary configuration and both have peripheral flanges offset inwardly of the diametral plane of the corresponding assembly.

The right-hand assembly 98 is affixed to the shaft 96, as by welds 106, 107, and 108 at the passage of the axle through the disc 104, inner hemisphere 101 and outer hemisphere 100, respectively. The space between the two hemispheres 100 and 101 is thus sealed and isolated from the space between the inner hemisphere 101 and disc 104. However, the left-hand assembly 97 is rotatably mounted on the axle 96 having a bearing means 110 centrally mounted on the disc 105 to receive the axle. At the left-hand end of the axle 96, as viewed in FIGURE 8, a collar 111 surrounds the axle and the collar contains a bearing means 112 fitted on the extremity of the axle 96.

At diametrically opposite positions the band 95 mounts a pair of studs 115 of the type best seen in FIGURE 9, which protrude inwardly to rotatably support opposite ends of the axle 96. Thus, the axle ends are each formed with a counterbore 116 the outer end of which receives a ball-bearing means 117 held in place by a lock ring 118.

A pair of the pressure pots 31 are mounted within the nose section 92 immediately behind the bulkhead 93. Both of these pressure pots have a fluid outlet from their water chambers through a solenoid-operated valve 34 and a pair of conduit means 119 extend from the solenoid valves forwardly through the bulkhead 93 to terminate in an annulus 120 surrounding the head of one of the studs 115. A branch line 121 extends inwardly from each of the conduits 119 terminating in an outlet towards the center of the hemispherical cavity 94.

The forward face of the bulkhead 93 also has a pocket 125 formed centrally of the hemispherical cavity 94. Behind the floor of this pocket a motor 126 is mounted on the bulkhead and has a gearbox 127 extending forwardly through the bulkhead and containing a gear means drivingly engaged with the output shaft of the motor 126. This gearbox has output shafts extending oppositely therefrom and adapted to be driven in opposite directions by the gear means for driving in opposite directions a pair of rollers 128 mounted on the extremities of the gearbox output shafts. These rollers have driving engagement with the hemispherical assemblies 97 and 98 whereby the assemblies are also rotated in opposite directions.

The solenoid switches 34 and motor 126 are connected in a circuit which includes a switch 130 and battery 131.

The switch 130 is normally open and has a connection 132 to a thermally responsive element 133 that can be mounted in the skin of the nose section 92 in a position immediately adjacent the extreme forward end of the nose section. When this skin temperature reaches a predetermined value calculated to give warning of the build-up of extreme temperatures on the hemisphere assemblies 97 and 98, the element 133 causes closing of the switch 130 whereupon the valves 34 are opened and the motor 126 simultaneously energized. The hemisphere assemblies 97 and 98 are thus caused to undergo counter-rotation and water from the pressure pots 31 is simultaneously delivered through the conduits 119 and branch conduits 121 for cooling the nose.

For conducting coolant water to the hemispheric assemblies 97 and 98 when the valves 34 are opened, both of the studs 115 in opposite ends of the axle 96 have suitable passages formed therethrough. Referring to FIGURE 9, it will be noted that the stud 115 is formed with a plurality of diametrically extending ports 140 whose outer ends are in fluid communication with the annulus 120. Each stud 115 also has another port or passage 141 extending axially inwardly from the diametral ports 140 and opening into the inner-end face of the stud. Both ends of the axle 96 are formed with a plurality of radially extending ports 142 which communicate at their inner ends with the inner end of the counterbore 116. Thus, in the case of the right-hand assembly 98, the coolant from the conduit 119 passes through the annulus 120, the diametral ports 140 into the inner end of the counterbore 116 from the axially extending port 141, and is then delivered outwardly through the ports 142 into the space between the hemispheres 100 and 101.

A slightly different arrangement is utilized for delivering the coolant to the interior of the left-hand hemispherical assembly 97, since this assembly is mounted for rotation relative to the axle 96. In this case, the collar 111 is formed with a plurality of radially extending ports 143 that at their inner ends communicate with an internal circumferential groove 144 of the collar. This groove has communication with the radial ports 142 of the left end of the axle 96 so that the coolant exhausted from the ports 142 has access to the space between the hemispheres 100 and 101 of the left assembly 97 through the groove 144 and ports 143.

When the missile nose section 92 enters the earth's atmosphere, the ram effect will cause a rapid increase in the temperature of the assemblies 97 and 98 and also the extreme forward-end portions of the nose-section body. When this temperature has reached a predetermined limit, well in advance of approach to the critical temperature limit for the material of the assemblies 97 and 98 and of the nose section 92, the thermally responsive element 133 is energized to actuate the switch actuator 132 for closing the switch 130. The control circuit for the motor 126 and valves 34 is thus closed, whereupon coolant is delivered into the space between the hemispheres 100 and 101 of both assemblies 97 and 98, and the hemispheric assemblies are simultaneously caused to rotate in opposite directions.

Some of the coolant is diverted through the branch conduits 121 for delivery into the hemispherical cavity 94 and into the gearbox pocket 125. Thus, as the assemblies 97 and 98 are rotated they pass through this delivered body of coolant in heat-exchanging relationship, and some of the coolant is carried by the revolution of the assemblies, to be dissipated by evaporation when coming out of the coolant bed.

Other portions of the coolant are delivered through the conduits 119 and through the ends of the axle 96 for delivery into the spaces between both sets of inner and outer hemispheres 101 and 100. Due to the speed of rotation of the assemblies 97 and 98, this coolant tends to be centrifugally held into contact with the inside surface of the hemispheres 100, especially at the regions remote from the axle and its thermal capacity is accordingly utilized very efficiently at the points of greatest need, particularly in those quadrants of the hemispheres 100 which bear the brunt of the ram temperature. It will be noted that the inner hemispheres 101 have a plurality of spaced orifices 145 formed therein. Accordingly, when the temperature of the outer hemispheres 100 is at the heat of vaporization of the coolant, the coolant passes through these orifices into the space between one of the discs 105, 104 and one of the inner hemispheres 101. The discs 105 and 104 are also formed with apertures 146 to provide an outlet for vapor and liquid into the space between the pair of discs. The coolant may be entirely vaporized by the time it passes out outwardly through the discs 104, 105 and its pressure then causes it to be exhausted between the slidably running rings 102.

It is to be noted that this arrangement utilizes not only the thermal capacity of the coolant, but also some of the thermal capacity of the inner hemispheres 101. It is also to be observed that the efficiency of this evaporative cooling system is greatly enhanced by virtue of the delivery of coolant to both the interior and exterior surfaces of the outer hemispheres 100.

The counterrotation of the assemblies 97 and 98 prevents their affecting the rate of descent but is helpful in directionally controlling the nose section 92, since the counterrotation tends to roll the nose section about its longitudinal axis. It will be apparent that the lineal speed of the hemispheres 100 is greatest in a hemispheric plane, i.e., immediately adjacent the ring 102, and gradually reduces to a minimum around the poles of the axis of rotation, i.e., around the ends of the axle 96. This is represented by the length and direction of the arrows in FIGURE 10. Those arrows on the sphere 98 are opposite in direction to the arrows and direction of rotation of the hemispherical assembly 97. On each assembly 97 and 98 the relative length of the arrows may be taken as an indication of the relative lineal velocity of that portion of the hemisphere on which the arrow appears.

Referring now to FIGURE 10, the sectors A represent the quadrants of the band 95 through which each of the assemblies 97 and 98 leave the band, while the sectors B represent the quadrants of the assemblies 97 and 98 through which the assemblies 97 and 98 rotate into the band 95. By analogy to the rotating tube 37 in the leading edges of the wing 12, seen in FIGURE 3, it will be observed that with respect to each hemispheric assembly 97 and 98, the air pressures within the quadrant A will be less than the air pressures within quadrant B. In each hemispherical assembly 97 and 98 the pressure differential will, of course, be greatest at the extremes of the diametral plane that is normal to the axis of rotation, i.e., the plane corresponding to the rings 102. Along this diametral plane, at the line of merger of a quadrant A with a quadrant B, the pressure differential will be most pronounced, since it comprises an area of maximum pressure of a quadrant A and an area of minimum pressure of a quadrant B. Accordingly, the direction of relaxation of the airstream is clockwise, and due to the friction of the boundary layer of the airstream on the front end of its body, the nose section 92 is urged in a corresponding direction, to roll about its longitudinal axis.

While I have shown and described several embodiments of my invention, it is to be understood that I do not wish to be limited to the details of construction hereinabove set forth, but only by the spirit and scope of the following claims.

I claim:

1. A space vehicle comprising: an airframe; an endless surface rotatably mounted in said airframe as a leading surface of said airframe; a coolant reservoir mounted in said airframe; a means to deliver coolant from said reservoir to said endless surface of said airframe; valve means to normally prevent the flow of coolant from said reservoir to said leading surface; a means to rotate said leading surface; and a means to open said valve means and energize said means to rotate said surface, whereby coolant can be delivered to said leading surface to dissipate heat when the temperature of said leading surface exceeds a predetermined value.

2. A space vehicle comprising: an airframe; a sphere mounted as an aerodynamic front end of said airframe for rotation, said sphere having its forwardly facing surface exposed as the leading surface of said airframe and having its aft surface enclosed within said airframe; a drive means in said airframe for rotating said sphere on said axis; a coolant reservoir mounted in said airframe; a means to deliver coolant from said reservoir to the aft surface of said sphere; and means to actuate both said drive means and said means to deliver coolant in response to a heating of said sphere above a predetermined temperature.

3. A space vehicle comprising: an airframe; a hollow sphere of sub-atmospheric internal pressure mounted in and comprising the leading surface of said airframe, said sphere being rotatable on a transverse axis of said airframe and said airframe having a forwardly opening, substantially hemispherical cavity through which said sphere can rotate; a pair of rollers mounted in a pocket formed centrally in said cavity for driving engagement with said sphere; a motor in said airframe for driving said rollers; a reservoir in said airframe; conduit means for conducting a coolant from said reservoir to said cavity; normally closed valve means to prevent the flow of coolant to said cavity through said conduit means; means to force coolant from said reservoir when said valve means is opened; and means to actuate said motor and open said valve means.

4. A space vehicle comprising: an airframe; a pair of hemispheres mounted in a nose of said airframe for counterrotation on a common axis normal to the longitudinal axis of said airframe, said hemispheres together defining a sphere that is partially recessed in the nose of said airframe; a reservoir mounted in said airframe; means to deliver coolant from said reservoir to the interior of said hemispheres; means in said airframe for counterrotating said hemispheres; valve means to normally prevent the flow of coolant from said reservoir; and means to open said valve means and to actuate said means for counterrotating said hemispheres when said airframe reaches a predetermined temperature.

5. A space vehicle comprising: an airframe; a pair of hemispheres mounted in a nose of said airframe for counterrotation on a common axis normal to the longitudinal axis of said airframe, said hemispheres together defining a sphere that is partially recessed in a substantially hemispherical cavity in the nose of said airframe; a reservoir mounted in said airframe; means to deliver coolant from said reservoir to said cavity; means in said airframe for counterrotating said hemispheres; valve means to normally prevent the flow of coolant from said reservoir; and means to open said valve means and to actuate said means for counterrotating said hemispheres when said air frame reaches a predetermined temperature.

6. A space vehicle comprising: an airframe; a pair of hemispheres mounted in a nose of said airframe for counterrotation on a common axis normal to the longitudinal axis of said airframe, said hemispheres together defining a sphere that is partially recessed within a hemispherical cavity in the nose of said airframe; a reservoir mounted in said airframe; means to deliver coolant from said reservoir to the interior of said hemispheres and to said cavity; means in said airframe for counterrotating said hemispheres; valve means to normally prevent the flow of coolant from said reservoir; and thermally responsive means to open said valve means and to actuate said means for counterrotating said hemispheres when said airframe reaches a predetermined temperature.

7. A space vehicle comprising: an airframe; a pair of hemispheric assemblies mounted in a nose of said airframe for counterrotation on a common axis normal to the longitudinal axis of said airframe, said assemblies together defining a sphere that is partially recessed in the nose of said airframe, each of said assemblies comprising a pair of concentric coaxial inner and outer hemispheres of different radii interconnected by a diametral disc, said discs of both said assemblies being in sliding contact only in their areas between said inner and outer hemispheres and being spaced apart from one another in their areas bounded by said inner hemispheres, said discs in said bounded areas and the inner ones of said hemispheres being formed with openings for the passage of coolant released from the spaces between said inner and outer hemispheres; a reservoir mounted in said airframe; means to deliver coolant from said reservoir to the spaces between said inner and outer hemispheres of both assemblies; means in said airframe for counterrotating said hemispheric assemblies; valve means to normally prevent the flow of coolant from said reservoir; and thermally responsive means to open said valve means and to actuate said means for counterrotating said hemispheric assemblies when said airframe reaches a predetermined temperature.

8. A space vehicle comprising: an airframe; a pair of hemispheric assemblies mounted in a nose of said airframe for counterrotation on a common axis normal to the longitudinal axis of said airframe, said hemispheric assemblies together defining a sphere that is partially recessed in a substantially hemispherical cavity in the nose of said airframe, each of said assemblies comprising a pair of concentric coaxial inner and outer hemispheres of different radii interconnected by a diametral disc, said discs of said assemblies being in sliding contact in their areas between said inner and outer hemispheres and being spaced apart from one another in their areas bounded by said inner hemispheres, said discs in said bounded areas and the inner ones of said hemispheres being formed with openings for the passage of coolant released from the spaces between said inner and outer hemispheres; a reservoir mounted in said airframe; means to deliver coolant from said reservoir to the spaces between said inner and outer hemispheres of both assemblies and to said cavity; a motor mounted in said airframe and drivingly engaged with a pair of counterrotating rollers, said rollers being in driving engagement with opposite ones of said hemispheric assemblies for counterrotating said assemblies; normally closed solenoid valve means to normally prevent the flow of coolant from said reservoir; an electrical circuit including said valve means, said motor and a normally open switch; and a means connected to said switch including a thermally responsive element adapted to close said switch in response to a predetermined temperature of said airframe.

9. A space vehicle comprising: an airframe; a band affixed to and encircling the forward end of said airframe; a rotatable axle mounted diametrically in said band; a pair of hemispheric assemblies mounted coaxially on said axle and together defining a sphere, said airframe having a bulkhead behind said sphere, said bulkhead on its forward face having a substantially hemispherical cavity through which said assemblies are rotatable, one of said assemblies being mounted for rotation with said axle and the other of said assemblies being mounted for rotation on said axle, each of said assemblies comprising a pair of concentric coaxial inner and outer hemispheres of different radii interconnected by a diametral disc, said discs of both assemblies being in sliding contact in their areas between said inner and outer hemispheres and being spaced apart from one another in their areas bounded by said inner hemispheres, said discs in said bounded areas and the inner ones of said hemispheres being formed with openings for the passage of a coolant released from the spaces between said inner and outer hemispheres; a reservoir mounted in said airframe; conduit means to deliver coolant from said reservoir to said spaces between the inner and outer hemispheres of both assemblies through the opposite ends of said axle and also adapted to deliver coolant to said cavity; means to displace a coolant from said reservoir for delivery through said conduit means; solenoid valve means to normally prevent the delivery of coolant through said conduit means; a motor mounted on said airframe in driving engagement with a pair of rollers that are drivingly engaged with said assemblies, and adapted to drive said rollers in opposite directions; a battery in said airframe; an electrical circuit having a normally open switch and including said battery, said valve means and said motor; and means including a thermal element on said airframe that responds to a predetermined temperature of a portion of said airframe to cause closing of said switch to open said valve and start said motor.

10. A space vehicle comprising: an airframe; an airfoil on said airframe; a rotatable cylindrical member adapted and arranged to comprise the leading edge of said airfoil; a porous element within said airfoil behind said cylindrical member; a means for rotating said cylindrical member; and a means to deliver a flow of a coolant along the length of said porous element for saturating said element with said coolant, said element having sliding contact with said cylindrical member whereby said cylindrical member passes in heat-exchanging relationship to said coolant.

11. A space vehicle comprising: an airframe; an airfoil on said airframe; a plurality of coaxially aligned tubular members mounted in end to end relation on the same side of the longitudinal axis of the airframe and positioned to form the leading edge of said airfoil; means for concurrently rotating said coaxial members in opposite directions; a source of evaporative coolant in said airframe; and means to deliver a flow of said coolant onto the surfaces of said tubular members along the length thereof while said members are being rotated.

12. A space vehicle comprising: an airframe; an airfoil on said airframe; a plurality of coaxially aligned tubes mounted in end to end relation on the same side of the longitudinal axis of the airframe and positioned to form the leading edge of said airfoil at said side; means for selectively rotating said coaxial tubes in the same or opposite directions; a source of evaporative coolant in said airframe; and means to deliver a flow of said coolant onto the surfaces of said coaxial tubes along the lengths thereof while said tubes are being rotated.

References Cited in the file of this patent

UNITED STATES PATENTS

| | | |
|---|---|---|
| 1,613,834 | Jordanoff | Jan. 11, 1927 |
| 2,367,075 | Ulmer | Jan. 9, 1945 |
| 2,514,105 | Thomas | July 4, 1950 |
| 2,522,114 | Goddard | Sept. 12, 1950 |
| 2,565,063 | Briscoe | Aug. 21, 1951 |
| 2,801,829 | Taylor | Aug. 6, 1957 |
| 2,873,933 | Fanti | Feb. 17, 1959 |
| 2,922,291 | Fox | Jan. 26, 1960 |
| 2,941,759 | Rice | June 21, 1960 |